July 15, 1941.  W. ENGBERT ET AL  2,249,420
FREQUENCY METER
Filed Aug. 31, 1938

INVENTORS
WILLI ENGBERT
FRIEDRICH HERZ
BY H. S. Srover
ATTORNEY

Patented July 15, 1941

2,249,420

UNITED STATES PATENT OFFICE 2,249,420

FREQUENCY METER

Willi Engbert and Friedrich Herz, Berlin, Germany, assignors to Telefunken Gesellschaft für Drahtlose Telegraphie m. b. H., Berlin, Germany, a corporation of Germany Application August 31, 1938, Serial No. 227,634
In Germany August 27, 1937

4 Claims. (Cl. 172—245)

In practice the lack of a simple measuring instrument often exists by means of which it is possible to properly measure the frequency of a wave especially where the amplitude thereof is subjected to any fluctuations.

An object of the present invention is to provide a frequency measuring means which is unaffected by amplitude variations of the wave to be measured.

A further object is to provide a simple convenient frequency meter which is substantially unaffected by variations in amplitude of the wave to be measured or in the power supply for the meter.

Still another object of the invention is to provide a direct reading frequency meter.

In accordance wtih the present invention an arrangement for measuring frequencies having a fluctuating amplitude is proposed, being characterized by the fact that an amplitude-limiting arrangement is provided across which the impulses to be counted per unit time are passed, and that through voltage integration and current integration voltage impulses and current impulses of the same content are derived and applied to a correspondingly calibrated A. C. instrument for mean values.

Figure 3:
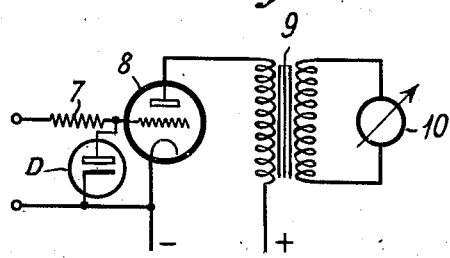
Figure 4:
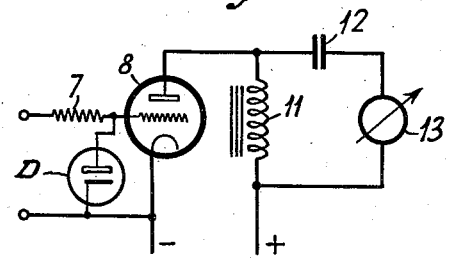
Figure 1:
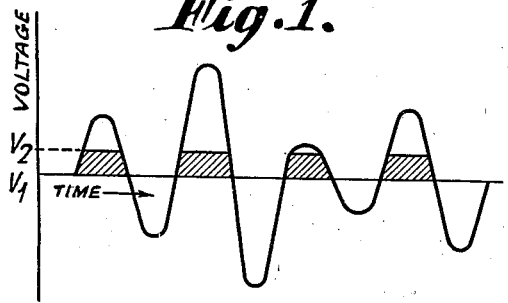
Figure 2:
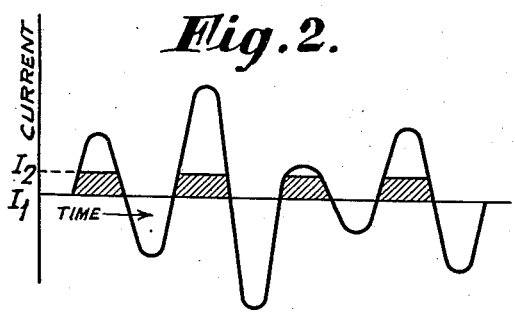
Figure 5:
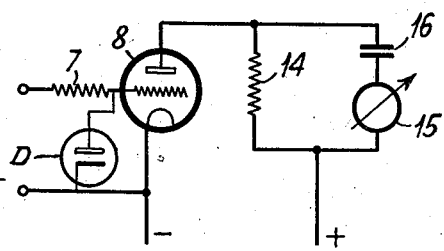

The present invention will be more fully disclosed in the following detailed description which is accompanied by a drawing in which Figures 1 and 2 are curves explanatory of the invention; Figure 3 is a circuit diagram of one embodiment of the invention and Figures 4 and 5 show modifications thereof.

In Figure 1 it is shown that the input amplitude of the frequency to be measured is so adjusted that despite variations of amplitude of any reasonable value only equal limiting potentials $V_1$ and $V_2$ will always be obtained. If these potentials are converted into currents by means of an ohmic resistance, a current pattern according to Figure 2 will be obtained in which the limit values $I_1$ and $I_2$ will not be exceeded.

From the impulses gained through the amplitude limitation, impulses are derived through differentiation which have the same content. In the case of differentiation there is caused by means of the current having the pattern as shown in Figure 2, a potential drop through a resistor which causes a charging of a parallel condenser.

It shall now be proven that the content of the impulses gained following the differentiation is determined solely by the limit values $V_1$ and $V_2$ and $I_1$ as well as $I_2$.

A capacity C reacts to a potential according to Figure 1 in accordance with the equation:

$$i = C \cdot \frac{dV}{dt}$$

A self inductance L reacts to the current according to Figure 2 as seen from the equation:

$$V = L \cdot \frac{di}{dt}$$

The current integral (Figure 1)

$$\int i \cdot dt = \int_{V_1}^{V_2} C \cdot dV$$

for an ascending or descending branch can be indicated by means of an electrolytic instrument for mean values (which indicates $$\frac{1}{T} \int i \cdot dt)$$

and this integral always has the value $$C \cdot (V_2 - V_1)$$

In accordance with Figure 2 there will be obtained for the voltage integral:

$$\int V \cdot dt = \int_{I_1}^{I_2} L \cdot di = L \cdot (I_2 - I_1)$$

Therefore, this indication is independent of the kind of steepness of the curve according to the current curve and voltage curve of Figure 1 or 2. The number of current integrals for the measurement according to Figure 1 and that of the voltage integrals for the measurment according to Figure 2 is equal to the double frequency if the ascending branch as well as the descending branch of a half wave is utilized. Hence, the frequency can be read directly at the current measuring instrument and voltage measuring instrument.

As will be seen in Figure 1 and Figure 2 only a part of the amplitude is utilized. The remaining amplitude parts are cut off by means of a limiting circuit. Such limiting may be carried out, for instance, by means of a high resistance placed ahead of the grid of an electron tube. When grid current flows a potential drop will be produced across the resistor placed in the grid circuit which has the effect that the plate current is maintained constant. Thus, a positive grid potential is in this case impossible. The action may be increased by means of a diode placed in parallel as indicated by D in Figures 3, 4 and 5.

The impulse potential applied to the circuit hence produces a current extending from zero for a grid biasing potential $$-v_g = \frac{i}{D} \cdot V_a$$

up to an unequivocal maximum value at the grid biasing potential $v_g=O$ (D is the amplification factor of the tube, and $V_a$ is the plate potential). It is immaterial whether at O volts the working point lies in the lower bend or in any intermediate position. The impulse potential need only be higher than the control range of the tube. The appearing current variation is the same for each period.

The measurement of the impulses by means of the tube arrangement in whose grid circuit a high-ohmic resistor is placed can be carried out in various ways. Examples of construction are shown in the Figures 3, 4 and 5. In accordance with Figure 3, the plate current of tube 8, in whose grid circuit the limiting resistor 7 is placed, is passed through the primary winding of a transformer. The appearing alternating plate potential passes in this way into the secondary circuit of the transformer 9 in which the indicating instrument 10 is placed. This voltage meter 10 may be calibrated directly in frequency units. The measuring instrument is an A. C. instrument whose time constant is high as compared with the frequency to be measured. In place of the transformer 9 a choke 11 may be employed, as shown in Figure 4. The direct current is in this modification withheld from the indicating instrument 13 by means of a large condenser 12.

Where the alternating plate current is to be measured directly, a condenser 16 is placed in series with the indicating instrument 15 and shunted by a resistor 14 for the direct current. The instruments 13 and 15 may obviously likewise be calibrated directly in frequency units so that the frequency to be measured will be directly indicated.

The afore-described amplitude limitation through the use of a series resistor in the grid circuit and utilization of the initiation of grid current flow is especially advantageous since the limiting of the amplitude in the arrangement according to the present invention depends solely on the amplification factor of the tube and not on its emission, i. e., on its heating. Hence, this arrangement can be used to advantage in ordinary receivers, for instance, for eliminating disturbances.

We claim:

1. An arrangement for measuring the frequency of a wave having a fluctuating amplitude including an amplitude limiting arrangement comprising a vacuum tube having an anode, a cathode and a grid, a high resistance having one end connected to said grid, means for applying said wave to said cathode and the other end of said resistance, a rectifier so connected from said grid to said cathode as to dissipate positive charges on said grid, means for connecting a source of potential in circuit between said anode and said cathode, means connected to said anode for differentiating the limited amplitude wave and alternating current indicating means connected to said differentiating means for obtaining an indication proportional to the frequency of said wave.

2. An arrangement for measuring the frequency of a wave having a fluctuating amplitude including an amplitude limiting arrangement comprising a vacuum tube having an anode, a cathode and a grid, a high resistance having one end connected to said grid, means for applying said wave to said cathode and the other end of said resistance, a rectifier so connected from said grid to said cathode as to dissipate positive charges on said grid, means for connecting a source of potential in circuit between said anode and said cathode, means connected to said anode for differentiating the limiting amplitude wave and alternating current indicating means connected to said differentiating means for obtaining an indication proportional to the frequency of said wave, said differentiating means comprising a transformer having its primary connected between said anode and said potential supply and its secondary connected to said indicating means.

3. An arrangement for measuring the frequency of a wave having a fluctuating amplitude comprising an amplitude limiting circuit including a vacuum tube having an anode, a cathode and a grid, a high resistance having one end connected to said grid, means for applying said wave to said cathode and the other end of said resistance, a rectifier so connected from said grid to said cathode as to dissipate positive charges on said grid, means for connecting a source of potential in circuit between said anode and said cathode, a condenser also connected to said anode for differentiating the limiting amplitude wave and an alternating current indicating means connected from said condenser to said source of potential for obtaining an indication proportional to the frequency of said wave.

4. An arrangement for measuring the frequency of a wave having a fluctuating amplitude including an amplitude limiting arrangement comprising a vacuum tube having an anode, a cathode and a grid, a high resistance having one end connected to said grid, means for applying said wave to said cathode and the other end of said resistance, a rectifier so connected from said grid to said cathode as to dissipate positive charges on said grid, means for connecting a source of potential in circuit between said anode and said cathode, means connected to said anode for differentiating the limiting amplitude wave and current measuring means connected to said differentiating means, said current measuring means being calibrated in units of frequency whereby an indication proportional to the frequency of said wave is obtained.

WILLI ENGBERT.
FRIEDRICH HERZ.